United States Patent [19]

Croucher, Jr.

[11] Patent Number: 5,761,240
[45] Date of Patent: Jun. 2, 1998

[54] METHOD AND APPARATUS FOR DETERMINING AN OPTICAL COMMUNICATIONS CHANNEL WITHOUT LOSS OF CHANNEL MESSAGES ON A CURRENT COMMUNICATIONS CHANNEL

[75] Inventor: Russell L. Croucher, Jr., Forest, Va.

[73] Assignee: Ericsson Inc., Research Triangle Park, N.C.

[21] Appl. No.: 595,867

[22] Filed: Feb. 6, 1996

[51] Int. Cl.$^6$ ............... H04B 3/46; H04B 17/00; H04Q 1/20
[52] U.S. Cl. ............... 375/224; 455/437; 455/423; 455/525; 455/67.3
[58] Field of Search ............... 375/224, 347; 455/67.3, 437, 525, 423, 426, 434, 67.1

[56] References Cited

U.S. PATENT DOCUMENTS

| | | |
|---|---|---|
| 4,686,676 | 8/1987 | McPherson . |
| 4,829,519 | 5/1989 | Scotton et al. . |
| 4,905,302 | 2/1990 | Childress et al. ............ 455/34 |
| 5,054,035 | 10/1991 | Tarallo et al. . |
| 5,200,954 | 4/1993 | Teel, Jr. et al. ............ 370/94.1 |
| 5,475,683 | 12/1995 | Harrison et al. . |
| 5,493,563 | 2/1996 | Kozanski et al. ............ 370/50 |
| 5,517,674 | 5/1996 | Kune ............ 455/33.2 |
| 5,553,075 | 9/1996 | Westin ............ 370/94.1 |
| 5,553,243 | 9/1996 | Harrison et al. ............ 375/224 |
| 5,579,339 | 11/1996 | McClaughry ............ 375/220 |
| 5,903,321 | 2/1990 | Hall et al. ............ 455/34 |

FOREIGN PATENT DOCUMENTS

| | | |
|---|---|---|
| 0 530 165 A | 3/1993 | European Pat. Off. . |
| 2206018 | 12/1988 | United Kingdom . |
| 90/13187 A | 11/1990 | WIPO . |

Primary Examiner—Stephen Chin
Assistant Examiner—Mohammad Ghayour
Attorney, Agent, or Firm—Nixon & Vanderhye P.C.

[57] ABSTRACT

A method and apparatus are provided for determining the fidelity of one or more communications channels with high efficiency and resolution with particularly advantageous application to digital communications in a radio communications environment where portable radios roaming across multiple RF site coverage areas strive to monitor the optimal control channel having the highest signal fidelity under current receiving conditions. The radio collects signal fidelity information for alternative communications channel in very short time intervals without missing important messages on a communications channel currently being monitored by that radio. Signal fidelity of the alternative communications channel is calculated without the radio being synchronized either at a digital bit or frame level to the alternative communications channel. The fidelity calculation provides information both about the accuracy (i.e., the digital value of a received digital pulse) and the quality (i.e., the level of distortion of the received pulse) of the received signal.

51 Claims, 13 Drawing Sheets

Fig. 1 *(Prior Art)*
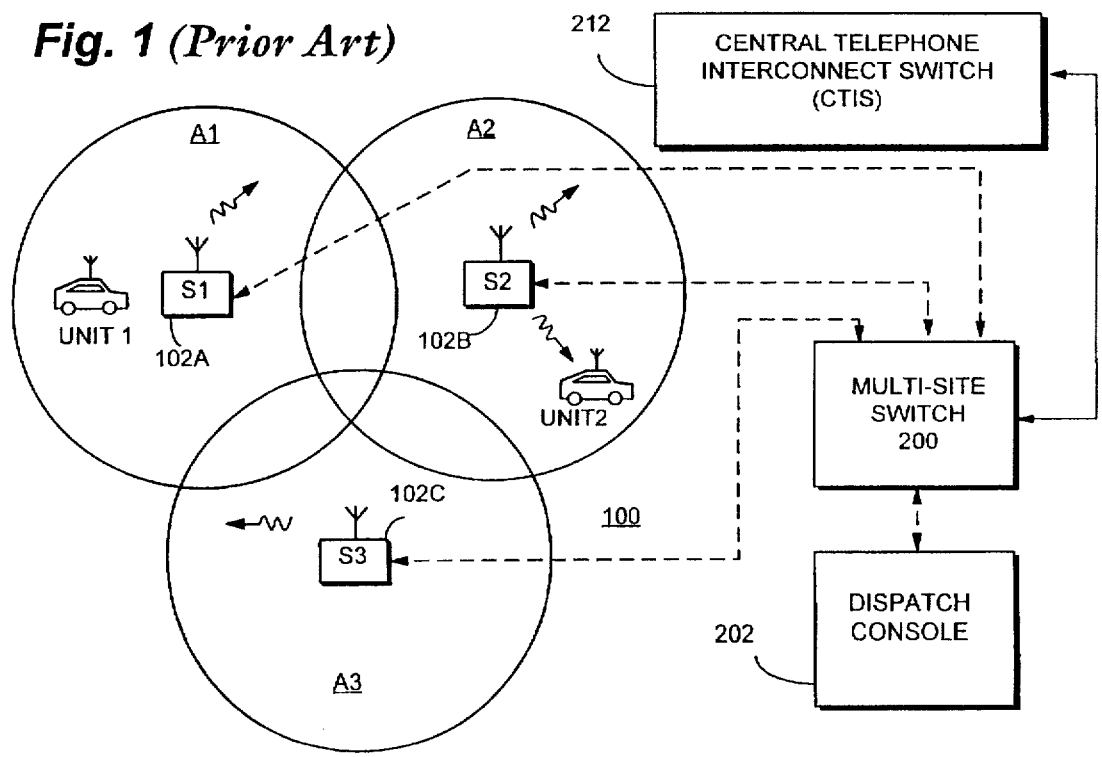
Fig. 2
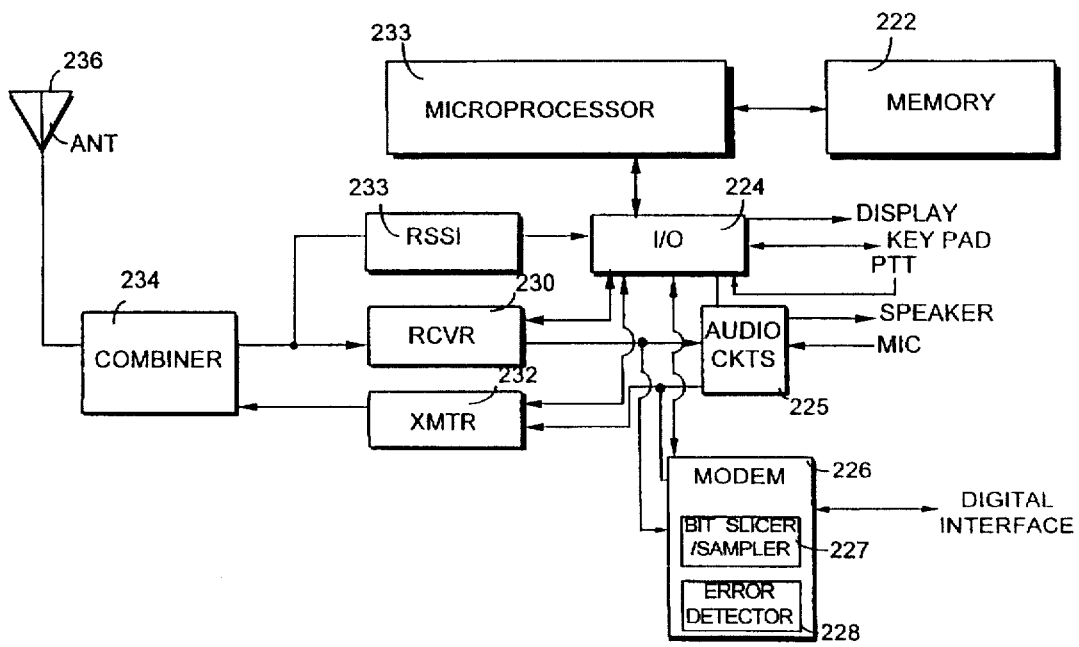

METHOD AND APPARATUS FOR DETERMINING AN OPTICAL COMMUNICATIONS CHANNEL WITHOUT LOSS OF CHANNEL MESSAGES ON A CURRENT COMMUNICATIONS CHANNEL

FIELD OF THE INVENTION

This invention relates to digital communications, and more particularly, to a method and apparatus determining an optimal communications channel, e.g., in terms of signal fidelity, without losing messaging information being transmitted on a current communications channel. The present invention is particularly well suited for trunked (RF) communications systems where mobile/portable radios roam between trunked (RF) communication sites and select a particular site based on the current fidelity determined for an RF communication channel associated with each site.

RELATED U.S. APPLICATIONS

This application is related to copending application Ser. No. 08/178,547 entitled "A Method and Apparatus for Determining with High Resolution the Fidelity of Information Received on a Communication Channel" and Ser. No. 08/178,547 entitled "A Method and Apparatus for Permitting Radio Unit Roaming between Trunked RF Transmission Sites over a Wide Area Encompassing Plural Multisite Networks."

BACKGROUND AND SUMMARY OF THE INVENTION

Trunked RF repeater systems and digital trunked radio transceivers capable of handling communications between numerous mobile units and dispatcher consoles in a single area are known. Trunked RF repeater systems are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, each digitally trunked RF communication site is assigned a "control" RF channel and multiple "working" RF channels. The working channels carry actual communications traffic (e.g., analog FM, digitized voice, digital data, etc.). The control channel carries digital control signals between the repeater sites and user RF transceivers (radio) in the field. When a user's transceiver is not actively engaged in a conversation, it monitors the control channel for "outbound" digital control messages directed to it. User depression of a push-to-talk (PTT) switch results in a digital channel request message for a working channel (and specifying one or a group of callees) which is transmitted "inbound" over the RF control channel to the repeater site. The repeater site (and associated trunking system) receives and processes the channel request message.

Assuming a working channel is available, the site transmits a responsive digital "outbound" channel assignment message over the RF control channel. This message temporarily assigns the available working channel for use by the requesting transceiver and other callee transceivers specified by the channel request message. The channel assignment message automatically directs the requesting (calling) transceiver and callee transceivers to tune to the available RF working channel for a communications exchange, i.e., a call.

When the communication terminates, the transceivers "release" the temporarily assigned working channel and return to monitoring the RF control channel. The working channel is thus available for reassignment to the same or different user transceivers via further messages conveyed over the RF control channel. An exemplary single site trunked RF repeater system is disclosed in commonly-assigned U.S. Pat. Nos. 4,905,302 and 4,903,321 which are incorporated here by reference.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing RF communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site typically includes a site controller (e.g., a digital computer) that acts as a central point for communications in the site, and is capable of functioning relatively autonomously if all participants of a call are located within its associated coverage area.

To enable communications from one area to another, a switching network, (sometimes referred to as a "multisite switch"), may be provided to establish audio and control signal pathways between repeaters of different sites. These pathways are set up at the beginning of each call and taken down at the end of each call. For example, the site controller (S1) receives a call from a mobile radio in area A1 requesting a channel to communicate with a specific callee. A caller requests a channel simply by pressing the push-to-talk (PTT) button on his microphone. This informs the site controller S1 via an "inbound" digital control message transmitted over the site's RF control channel that a working or audio channel is requested. The site controller assigns a channel to the call and instructs the caller's radio unit to switch from the site's control channel to the audio channel assigned to the call. However, this assigned working channel is applicable only within the area covered by that site.

In addition, the site controller sends the channel assignment to multisite switch (200) which assigns an internal audio time slot to the call. The multisite switch also sends a channel request over a control messaging bus to other site controllers having a designated callee within their site area.

Audio signals are routed through the multisite switch such that audio pathways are created to serve one or more callees and one or more dispatcher consoles 202 involved in the communication. Upon receiving a channel request, these "secondary" site controllers (in the sense they did not originate the call) assign an RF working channel to the call. Each secondary working channel is operative only in the area covered by the secondary site controller. The secondary site controller(s) also sends the channel assignment back up to the multisite switch.

Thus, the caller communicates with a radio unit or group of radio units in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

Detailed description and operation of such a distributed multi-site switch is set forth for example in commonly assigned U.S. Pat. No. 5,200,954 to Teel, Jr. et al which is incorporated herein by reference.

Mobile/portable radios often "roam" from one trunked RF communications site to another. As a radio roams, it may detect a deterioration in reception of the monitored communications channel of its currently selected site. That deterioration may be measured using various techniques, anyone (or more) of which may be used in the present invention. For example, several techniques are disclosed in the above-identified U.S. patent application Ser. No. 08/178,547 entitled "A Method and Apparatus for Determining with High Resolution the Fidelity of Information Received on a Communication Channel."

If a communications channel of an adjacent site has a better signal fidelity than the currently selected communications channel, it is in many instances prudent for the mobile/portable radio to abandon its current communications channel and switch over to the adjacent/higher fidelity communications channel. That adjacent channel then becomes the new, currently selected communications channel.

While it is desirable for roaming radios to discover and use the best possible communications channel, there is a significant disadvantage associated with this process. In scanning several communication channels to decide which channel has the highest fidelity, a radio may miss message information transmitted over the radio's currently selected channel. Considerable time is consumed when the radio retunes its receiver from the current channel frequency to another channel frequency and then searches for known bit synchronization and word synchronization bit patterns present in each frame of that channel. In addition, during the time interval during which the other channel is being monitored, the radio may lose bit and/or frame synchronization with its currently selected channel which requires additional time as the radio must reacquire synchronization when it returns to that channel before the radio can substantively process received messages. To put the problem in real world context, if a radio searches for a new, potentially higher fidelity channel twice per second, the radio may lose 25%–30% of the messages transmitted over the currently selected channel. Thus, for every ten messages transmitted on the currently selected channel, three messages may be missed.

That lost information has significant consequences especially when the currently selected channel is a control channel—the backbone of modern digital radio communications. For example, the radio may miss channel assignments transmitted over the control channel intended specifically for that radio. As a result, the radio must wait for and process a subsequent control channel update message before it can move to the assigned channel. The radio will likely miss one or more seconds of the call which is inconvenient in voice calls and even more problematic in pure data communication calls. There is a probability that the radio will also miss control channel update messages. In this situation, two or more seconds of voice/data are typically lost.

One way of avoiding such loss of voice/data is to deactivate the radio's scan search for higher fidelity communications channels when the currently selected channel is of satisfactory fidelity. But this alternative tends to defeat the overall objective of obtaining the best available communications channel having the highest signal fidelity.

An associated disadvantage is that the message loss increases as the number of potential alternative communications channels being scanned/monitored increases. If four or five messages are missed for each alternative channel scanned, scanning four or five channels means that 20 to 25 messages may be missed. Thus, the number of alternative channels that can be realistically scanned is severely limited by the accompanying loss of message information on the currently selected channel.

Another problem addressed by the present invention pertains to the complexity of the signal fidelity evaluation technique as well as its sensitivity and resolution. Overly complicated techniques add even further to the time delay associated with evaluating the fidelity of alternative communications channels thereby increasing the number of missed messages on the currently selected communications channel. In addition, such techniques simply look at whether the bit value was accurately or erroneously received. There is no attempt to evaluate the quality of the signal corresponding to the bit value. In other words, the received pulses, even though they are discernible as digital pulses, may nevertheless have distorted pulse wave forms, i.e., less than optimal signal fidelity.

The present invention overcomes the above-described problems by providing a method and apparatus for determining with high efficiency and resolution the fidelity of a communications channel. Both the accuracy (i.e., the value of a received digital pulse) and quality (i.e., the level of waveform distortion of the monitored signal) are determined with the signal fidelity calculation procedure in accordance with the invention. Unlike systems which simply detect whether the received bits have the correct values, the present invention also evaluates whether the received pulse corresponding to each bit has an undistorted waveform indicating a higher degree of signal fidelity or a distorted pulse wave form indicating a lower degree of signal fidelity.

In particular, the fidelity of a digital signal received over a digital communications channel is evaluated using a relatively simple but nevertheless powerful procedure. A digital signal received on the digital communications channel includes a number of digital bits corresponding to a message. Each received bit in the message is sampled N times at N corresponding sampling intervals, with N being a positive integer. Multiple sets of sample values, i.e., N sets, are compared to an expected set of values for the received bits. One set of expected values could be a predetermined, known bit pattern that recurs in each frame of digital information or it could be a value particular to the actual information contained in the received message, such as a cyclic redundancy code (CRC). Each comparison results in either a successful match or a failed match. A total number of successful matches is summed to generate a fidelity indicator for the digital communications channel. The larger the indicator number, the higher the signal fidelity. In addition, the larger the number of N samples per bit the greater the resolution of the fidelity indicator, and the higher the sensitivity of the indicator to signal distortions.

This method of determining the fidelity of a digital signal received on a digital communications channel is applied in an example embodiment of the invention to portable radio receivers roaming across multiple RF site areas, where each radio strives to monitor at any one time the optimal control channel having the highest signal fidelity under current receiving conditions. Each communications channel is divided into a series of frames with each frame including a first field of synchronization bits and a second field of message bits. The second field includes a first message followed by other information. After the first message in the frame is received over a currently selected radio channel, the radio scans another communications channel to determine its fidelity if the remaining frame information over the selected channel following the first message does not need to be processed by the radio. Such remaining information could include redundant or other non-essential information. Fidelity calculations are made during the remainder of that frame, and the radio returns to the selected channel before the next frame. In this way, the present invention permits the radio to collect signal fidelity information for alternative communication channels without missing important messages on the digital communications channel currently being monitored by that radio.

The present invention obtains the necessary fidelity information from alternative communications channels in a very short time (e.g., a portion of one frame). The technique used to calculate signal fidelity of the alternative communications channel does not require the radio to be synchronized either at a digital bit level or a digital word/frame level to the alternative communications channel. Synchronization with the alternate channel is not required because the sampling technique itself does not require bit or word synchronization. A number of bits corresponding to the length of a message is sampled at any point in the received signal stream. Each set of message length sample values is compared to an expected set of values for the message being analyzed. The number of comparison matches, if any, is recorded for the compared sample sets. The data bits sampled are then shifted by one bit, and the procedure is repeated. As a result, the data is shifted until the appropriate number of matches is obtained. An added benefit to this procedure is that the radio remains synchronized to its current communications channel. As a result, when the radio returns to the currently selected channel, it can immediately process the next frame of received data without having to resynchronize.

The fidelity of the current communications channel is periodically determined and the fidelity values for both channels can then be compared with the communication channel having the best fidelity being selected as the optimal communications channel. Should two fidelity values be relatively close, the present invention also provides for a "tie-breaking" technique. The received signal strengths for the currently selected and alternate communications channel are periodically detected. In the event that two channel fidelity values are substantially the same, the channel having the greater received signal strength is selected as the optimal communications channel.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout:

FIG. 1 is a schematic illustration of an exemplary multi-site trunked RF communications system;

FIG. 2 is a block diagram of a mobile/portable radio transceiver unit that may be used in accordance the present invention;

DETAILED DESCRIPTION OF THE DRAWINGS

Figure 3:
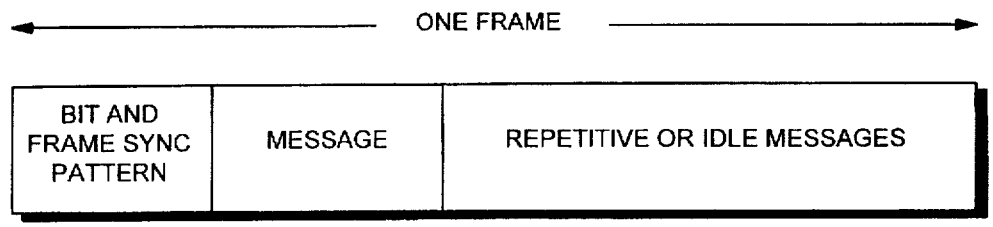
FIG. 3 is an illustration of one example frame of information on a communications channel to be processed in accordance with the present invention.

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

The preferred embodiment of the present invention is described in the context of trunked RF communications. However, those skilled in the art will recognize that the present invention may be readily applied to any communications system having alternative communications channels including all types of communications media, e.g., air, wire, optical link, etc.

An exemplary trunked radio repeater system 100 in accordance with the invention is generally depicted and was described above in conjunction with in FIG. 1. Although only multisite network 100 is shown for purposes of illustration, the present invention is also applicable to extended networks having two or more digital multisite switches which permit even greater coverage. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller via an "inbound" digital control message transmitted over its assigned RF control channel that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the working channel assignment to multisite switch 200. The switch, in turn, sends a channel request to all other site controllers and routes audio signals such that an audio signal pathway is created between the RF site repeater servicing the caller and the RF site repeater(s) servicing the callee(s). Additional audio signal pathways may also be established in similar fashion such that one or more dispatch consoles 202 and land-line subscribers (via CTIS 212) may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call. Further details are provided, for example, in the above-referenced U.S. Pat. No. 5,200,954 to Teel, Jr.

The general architecture of a suitable mobile/portable radio unit for use with the present invention is microprocessor based as depicted in FIG. 2. Here, microprocessor 220 is provided with suitable memory 222 and input/output circuits 224 so as to interface with the radio display, keypad, push to talk (PTT) switch as well as audio circuits 226 which provide basic analog audio outputs to the speaker and accept analog audio inputs from the microphone. A modem 228 functions as a digital interface to voice encryption, vehicle location, the multi-site switch 200, and other types of digital communication subsystems. As described in further detail below, the modem 228 performs modulation/demodulation functions as well as sampling and error detection and/or correction functions. Of course, the I/O circuits 224 also permit suitable program control over RF receiver 230 and transmitter 232 which, via conventional signal combiner 234, permit duplex communication over a common antenna 236 as will be appreciated by those skilled in the art. Received signal strength indicator (RSSI) 233 detects the amplitude/strength of received signal and provides the microprocessor 220 with a corresponding digital signal strength value.

Each mobile/portable radio unit is free to roam from the area covered by a currently selected site to adjacent areas which are controlled by adjacent sites. Each site has its own site identification number (ID), control channel frequency, and group of working channel frequencies which are maintained in the radio unit's memory 222. As the radio unit roams and selects a new site as its current site, control messages from the new site are sent to the radio unit via the control channel of the newly selected site. In this way the radio unit maintains and updates a current database or list of the adjacent site IDs and corresponding control channel frequencies.

As a radio unit 1 moves away from the currently selected site S1 towards an adjacent site such as S2, the fidelity of signals received from site S1 gradually deteriorates. Conversely, as the radio unit 1 approaches adjacent site S2, the signal fidelity of transmissions received over a communications channel from that adjacent sites steadily improves. As described above, signal fidelity is affected by a number of factors, and therefore, cannot be fully measured using low resolution, simple bit error rate (BER) calculation techniques. Indeed, a high resolution indicator of signal fidelity for current and adjacent site communication channel transmissions which incrementally changes as the radio unit roams is required. For example, as soon as signal fidelity for the currently selected channel deteriorates to a specific "start scan" threshold, the present invention enables a part time scanning operation for determining the signal fidelity of communications received on control channels for adjacent sites. This part time scanning operation often coincides with the situation where the radio roams into a transition region where site area 1 and site area 2 overlap. In transition, there is a point at which the radio unit should switch communications from the current site to the adjacent site because the signal fidelity of adjacent site 2 communications exceeds that of site 1.

A switching delta Δ may optionally be employed to ensure that the switch from the current site to the adjacent site is performed when it has been determined that the signal fidelity of the adjacent site is considerably better than that of the current site. Once the signal fidelity of received signals for the current site reaches a minimum acceptable threshold, full time scanning for a more acceptable control channel is initiated. If the signal fidelity for the current control channel is less than the start scan threshold and the radio is not programmed to scan for a priority site, no scanning operation may be performed. Alternatively, the radio may be programmed to scan for a priority site if the current site is identified as a nonpriority site.

FIG. 3 shows an example of signaling protocol format for a single frame of information transmitted over a communications channel. The initial portion for field in the frame includes dotting bits and barker codes used by a radio to acquire bit and frame synchronization on the digital channel. The bit and frame synchronization pattern is followed by a message field which conveys the substantive information relating to the radio call followed by a third portion of the frame which typically includes repetitive or idle messages. Most radio protocols repeat to some extent the frame message and may also allocate a portion of the message field for what are typically referred to as "idle" messages. Such idle messages are included to provide each site with the rarely exercised option of sending important but relatively infrequent information to the radios over the control channel. By and large, however, the information in this third portion of the frame is non-essential and may be ignored for one or more frame periods, for example, without negative impact to the radio, e.g., missed messages that the radio has not yet already received.

Figure 4:
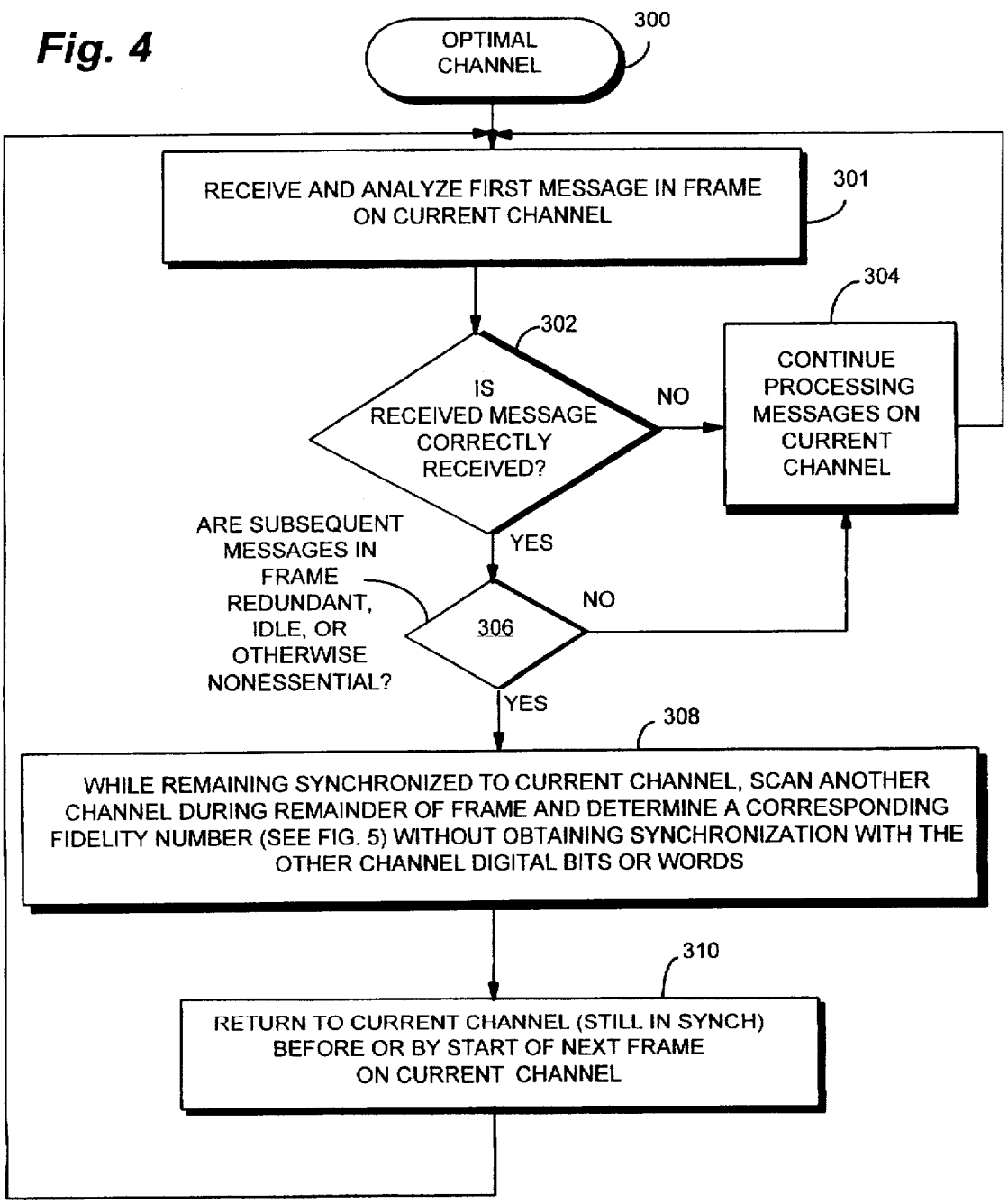
FIG. 4 is a flow chart diagram outlining the procedures employed by the present invention for determining an optimal communications channel.

A procedure performed by a portable radio unit shown in FIG. 2 for determining an optimal communications channel, e.g., a digital control channel, will now be described in conjunction with the optimal channel routine 300 illustrated in FIG. 4. Those skilled in the art will of course appreciate that the present invention is not limited to control channels but may be applied to any communications channel. The radio analyzes a first message received in a frame on the current communications channel (block 301). A decision is made in block 302 whether the received message is correctly received. For example, has the message been received without detectable errors in any of the bits? If not, the radio continues processing messages on that current communications channel (block 304). If the message has been correctly received, a second decision is made whether subsequent messages in the frame (i.e., those that follow the first message such as the second message portion of the frame shown in FIG. 3) are redundant, idle, or otherwise non-essential. If that determination cannot be made affirmatively, the radio continues processing messages on the current control channel (block 304). Otherwise, the radio scans another alternative communications channel while still remaining synchronized to the current communications channel during the remaining portion of the current frame (block 308).

During this scanning operation, the radio determines a fidelity indicator of that other channel without having to obtain synchronization with the alternative channel's digital bits or digital words using the methodology for calculating signal fidelity in accordance with the present invention. Of course, the present invention may be used in an approach where the radio obtains synchronization with the alternate digital channel. But a drawback with obtaining such synchronization is that in a majority of instances, at least one subsequent frame on the current communications channel will be missed by the radio while the radio is attempting to resynchronize with the alternate communications channel. Another drawback of obtaining synchronization with the alternate control channel (avoided by the present invention) is that the radio, upon returning to the currently selected communications channel, must regain bit and word synchronization with that currently selected communications channel since there is a possibility that the radio lost synchronization. As indicated in block 310, the radio can quickly return to the still synchronized control channel before or by the start of the next frame of information on the current channel, thereby avoiding missing messages in the next frame.

Accordingly, the radio can quickly scan alternate and possibly superior communications channels without having to compromise the integrity of messages transmitted over the current communications channel. In other words, the radio only elects to scan an alternate control channel when the first message of the current frame is accurately received and when the subsequent information in that frame is unessential. By returning before the frame expires, the radio not only receives the next frame of information on the current control channel, but also quickly determines whether it is advisable to switch from the current communications channel to an alternate, higher fidelity communications channel.

Figure 5:
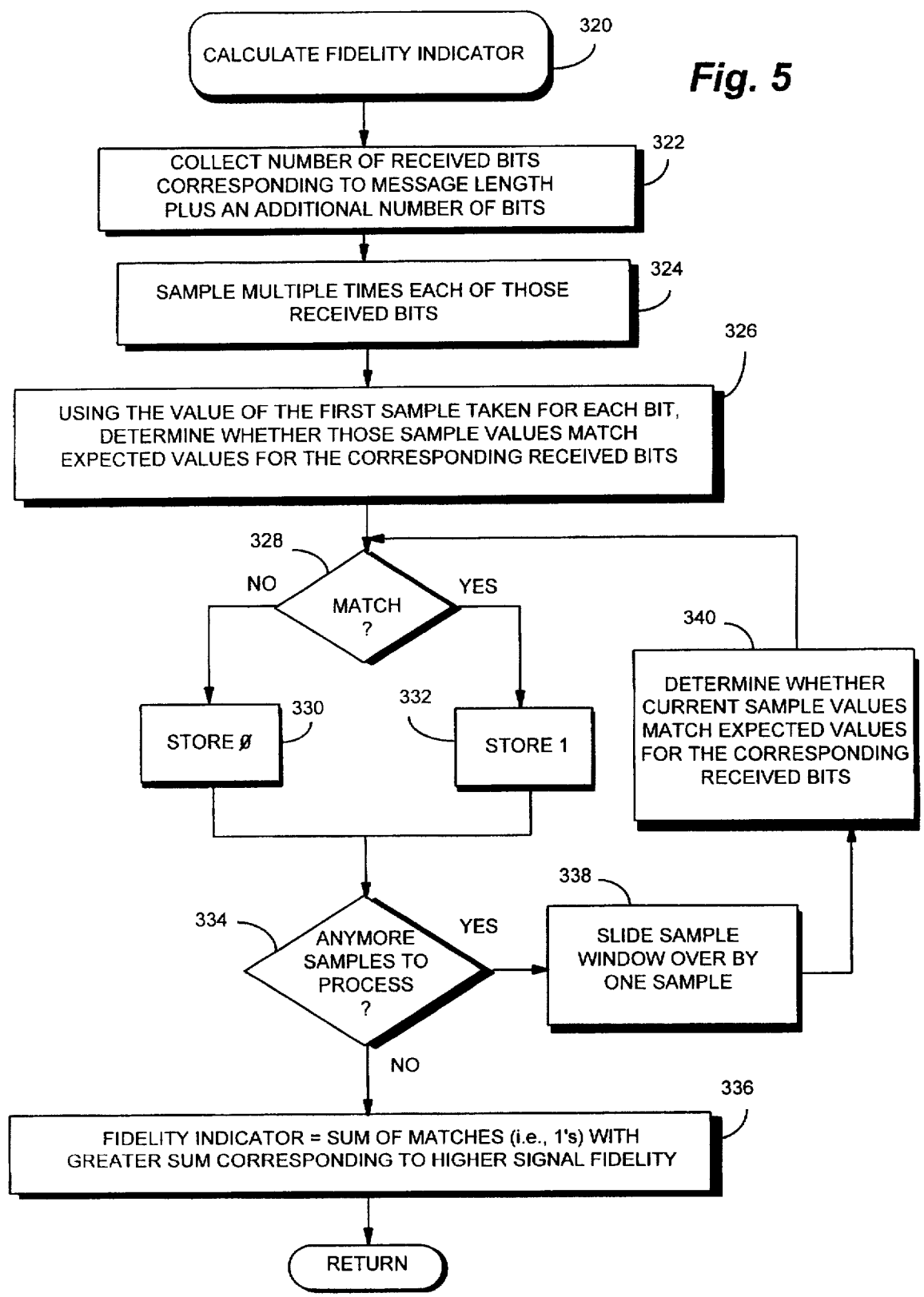
FIG. 5 is a flow chart diagram illustrating procedures for determining a fidelity indicator for a communications channel in accordance with the present invention.

Another important aspect of the present invention relates to the manner in which the fidelity of a signal received on a particular communications channel is calculated as outlined generally in the calculate fidelity indicator routine 320 illustrated in FIG. 5. In block 322, the radio modem 226 collects a specific number of demodulated, received bits corresponding to the length of the message being used to evaluate the fidelity of the communications channel. One example of the message length might be the number of bits in the first message received in the message portion of the frame shown in FIG. 3 plus an additional number of bits to insure that a full message is received and can be processed. Alternatively, the message length might correspond to a length of a known bit pattern such as the bit and/or frame synch pattern indicated in the first portion of the frame illustrated in FIG. 3. In one example embodiment, the actual collection time is sufficient to receive the following: (1) message length (40 bits); (2) maximum distance between messages (48 bits); and (3) preload of shift registers before searching (40 bits). This works out to be 88 bits of actual searching time, and an additional 40 bits to preload the shift registers so that a total of 128 bits is needed.

The modem bit/sampler 227 samples each of the received bits in the message multiple times to generate plural sample sets with each set of samples having the same number of sample values as the number of bits in the received message (block 324). Using the value of the first sample taken for each bit, the modem error detector 228 determines whether those sample values match expected values for the corresponding message or other signal (block 326). The expected values could be determined from a variety of different methods. For example, the expected values could correspond to the bit values of a known repetitive bit pattern included in each frame such as a synch pattern. Alternatively, the expected values could be determined depending on the specific message bits included in the actual message. In any event, the modem error detector detects whether each set of sample values matches the expected bit values (block 328). For each match, the modem stores a "1" (block 332); otherwise, a "0" is stored (block 330). A decision is made in block 334 if there are any more sample sets to process. If so, the next set of samples for the received message bits are processed (block 338). In other words, for a message with 40-bits sampled 8 times, there would be 8 sets of forty samples.

After the first set of samples are processed, the "window" "slides" by one sample position to the second set of samples. This next set of sample values is compared against the expected bit values (block 340), and a match determination is made in decision block 328. This procedure continues as long as necessary to exhaust the existing samples. Thereafter, a fidelity indicator for the collected number of received bits is calculated as the sum of the number of matches, i.e., the sum of the number of 1's stored in the sample analysis. The greater the sum, the higher the fidelity of the received signal.

The fidelity indicator serves two major functions: it indicates (1) the accuracy of the received data analyzed and (2) the quality of the signal analyzed. Regarding the first function, the existence of a match indicates a very high probability that the data bits were received without error. Of course, the absence of a match indicates the presence of one or more bit errors.

With respect to the second function, because multiple samples are taken per bit, information is also provided about the distortion of the received signals. Considering a pulse for a received digital "1" bit, one would expect a high quality pulse to consistently show the same "high" amplitude value corresponding to a digital "1" for a significant duration of the bit period. In that case, most if not all of the samples would also have a high value. Alternatively, for a lower quality signal, the signal amplitude for the received pulse may vary over the pulse duration with fewer of the samples having the same high value. In this way, a high quality, low distortion signal results in more matches and therefore a greater magnitude signal fidelity indicator. Conversely, a poor quality, high distortion (but nonetheless accurately received) signal would have fewer matches, and therefore, a lower magnitude signal fidelity indicator.

A more specific example application of the present invention to a particular radio protocol and configuration will now be described in conjunction with FIGS. 6–15. Of course, it will be understood that this more specific description is for illustrative purposes and is not intended to in any way limit the present invention.

Figure 6:
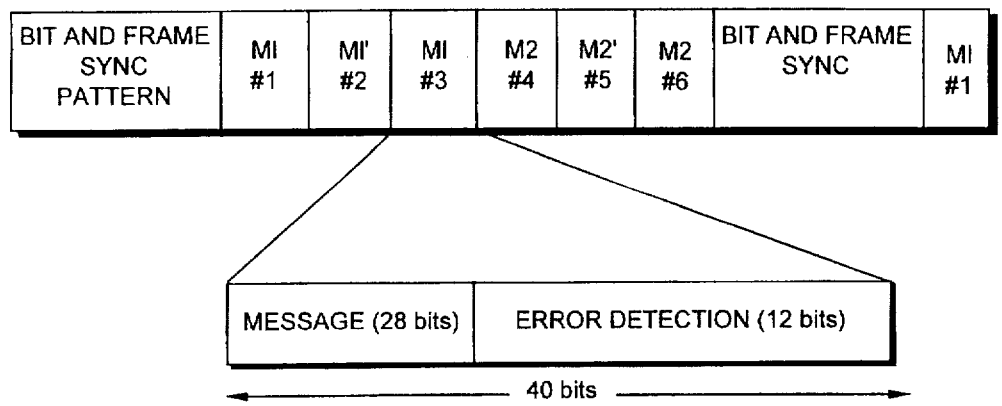
FIG. 6 is an illustration of one specific example frame format in which the present invention can be applied.

FIG. 6 illustrates an example of signaling protocol for a single repeater site over its corresponding control channel to radios tuned to the site's digital control channel. The frame includes an initial portion of bit and frame synchronziation pattern bits used by the radio to acquire bit and frame synchronization with the outbound control channel. In a preferred example embodiment, 48 bits are allocated for digital bit and frame synchronization bits. Each frame then includes six time slots which are allocated to message type information. Two messages, M1 and M2, may be transmitted per frame in the control channel. The first message (M1) of 40-bits is repeated as three consecutive redundant messages, M1, M1' (an inverted version of M1), and M1. Redundant message M2 is transmitted in complemented form for error checking purposes. The second, 40-bit message included in the control channel frame is likewise repeated three times M2, M2' (inverted), and M2. Each individual message in each time slot includes, for example 40-bits, with 28 bits of message content and 12 cyclic redundancy code (CRC) bits used for bit error detection and possibly error correction.

In most radio communication situations, the inventor of the present invention recognized that much of the message information after the first message time slot M1 is redundant or usually contains relatively unimportant information. One example of an unimportant message is an "idle" message such as a site ID update message which is often transmitted as the M2 message. Typically, such idle messages are non-changing and repeated over many frames. The inventor further recognized that the first message is usually received accurately in the first time slot. The redundant messages M1' and M1 in time slots 2 and 3 are unnecessary for accurate receipt and decoding of the M1 message content.

Consequently, there are a significant number of frames in which the remaining time slots 2–6 may be used to scan adjacent control channels to determine if an alternative channel has a higher fidelity than the currently selected control channel. In addition, since the bit and frame synchronization bits (in this example 48 bits) are usually only periodically required to maintain synchronization with the base station control channel transceiver, these 48 bits may also be periodically ignored without loss of synchronization to increase the time within the frame which is available for alternative control channel scanning. As a result, for a given frame, only a small amount of that frame time is required for receiving message M1 in the first time slot with a considerably larger time remaining for scanning alternative and perhaps higher fidelity control channels.

Figure 7:
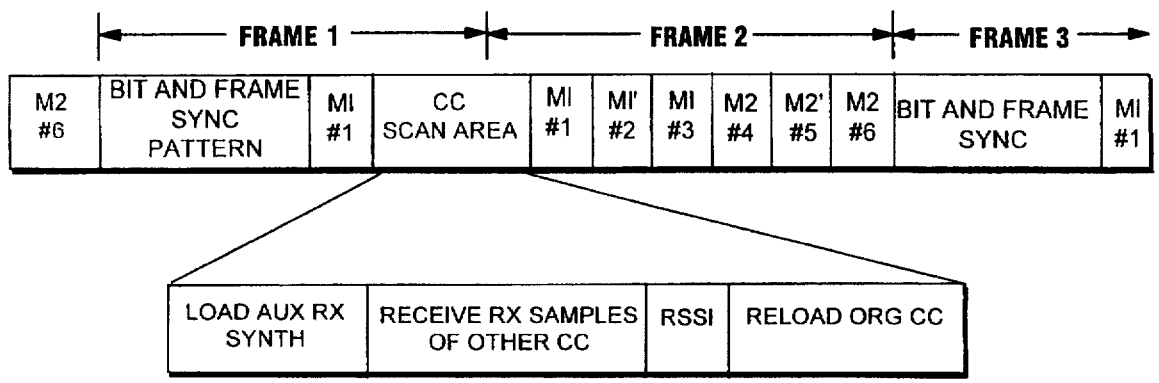
FIG. 7 shows procedures performed during a portion of the frame shown in FIG. 6 to scan an alternative control channel.

FIG. 7 illustrates that during the control channel scan time period four functions are performed. As illustrated, the bit and frame synch pattern for the next frame may optionally be included with the five message time slots #2–#6 of the current frame to lengthen the scan time period. First, just after receipt of message M1 in time slot 1, the radio's receiver 230 is tuned to an alternative control channel frequency (alternative control channel frequencies are stored in a data base in memory 222). Second, the adjacent control channel is sampled and processed in accordance with the procedures outlined generally above in FIG. 5 and explained in more detail below. Third, the signal strength of the received signal on the alternate communications channel is detected by the received signal strength indicator 233 and forwarded to microprocessor 220. Fourth, the receiver retunes to the original control channel frequency in time to detect the next frame.

Before the RF transmission, it is common in radio communications to encode digital messages using some type of error detection (and possibly correction) algorithm. The received signals are then appropriately decoded to detect and possibly correct for the presence of bit errors. One well known encoding technique is the Bose-Chauduri-Hocquenghem (BCH) code. Using the time slot allocation example shown in FIG. 6, 28 information data bits are BCH encoded at the base station control channel transceiver using 12 cyclic redundancy code (CRC) bits. In brief, BCH encoding (n,k) may be implemented as a linear (n−k)-stage shift register with feedback connections based on the generator polynomial given in equation (1) below with n=40 and k=28 in this example.

$$g(x) = x^{n-k} + g^{n-k-1}x^{n-k-1} + \ldots + g_2 x^2 + g_1 x^1 + x^0 \tag{1}$$

CRC decoding is performed to determine if the received 28 bits of a message have errors. At the receiving radio, 12 CRC bits are computed from the 28 information bits. The first step of CRC decoding then is the calculation of a 12-bit syndrome. The 12 CRC bits are calculated from the received first 28 bits $$v = \sum_{n=1}^{28} b_d(n) b_n \tag{2}$$

where $b_d(n)$ are the received 40-bits. Next the calculated 12 CRC bits are compared to the received and sampled 12 CRC bits. If the calculated and received 12 CRC bits match, and no errors are detected. Further information regarding CRC and BCH encoding/decoding may be found in a number of textbooks, e.g., *Error Control Coding*, Lin et al., published by Prentice-Hall Incorporated in 1983.

The BCH decoding process can be performed using either hardware or software techniques or a combination of both. For purposes of illustration only, the present invention illustrates the use of example hardware BCH decoding circuitry which may be included in error detection circuitry 228 of the radio modem 226. In the example shown in FIG. 8, the 40 data bits corresponding to the length of one message in the received frame are sampled four times per bit by the modem bit slicer 227. Four-way bit sampling is adopted as a simple illustrative example. In a preferred embodiment, eight-way bit (or greater) sampling per bit improves the resolution/sensitivity of the fidelity indicator calculation. With 4 samples per bit, there are a total of 160 samples for one 40-bit message. In a decoding example shown in FIG. 8, each set of 40 samples is input to a BCH decoder which decodes the received samples in accordance with a (40, 28) BCH code and compares the received BCH code with the BCH code calculated for the received sample values. The output of the modem BCH decoder is forwarded to the radio microprocessor 220 to indicate either a match ("1") or no match ("0"). The next set of 40 samples for those same 40 message bits is then decoded in similar fashion to provide another match or no match output to microprocessor 220.

The BCH is created by processing the 28 data bits through the BCH coder. A 12-bit BCH register is first cleared to 0, and 28 bits of data are processed through the BCH coder. The resulting 12 bits in the BCH register is the "syndrome" value. These 12 bits are appended to the message to produce the 40-bit frame. On the receive side, the 12 BCH register is first cleared to 0, and 40 bits of received data are processed through the BCH decoder. The resulting 12 bits are the syndrome value. If there is an exact match, this 12 bit value is 0. Other values indicate a bit is in error, and the syndrome can be used to correct 1 bit in error. However, the correction capabilities of the BCH value need not be implemented.

Figure 8:
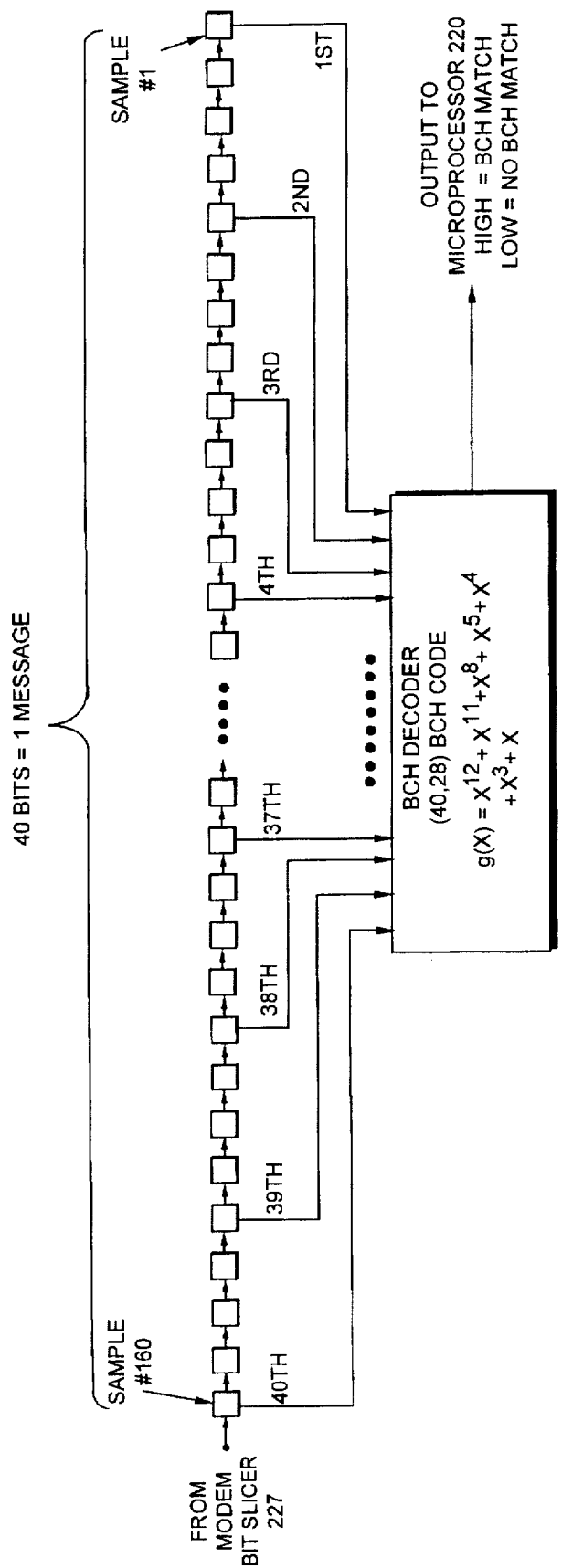
FIG. 8 illustrates in function block format a BCH decoder used to decode a 40-bit message of error detection circuitry in the radio modem.
Figure 9:
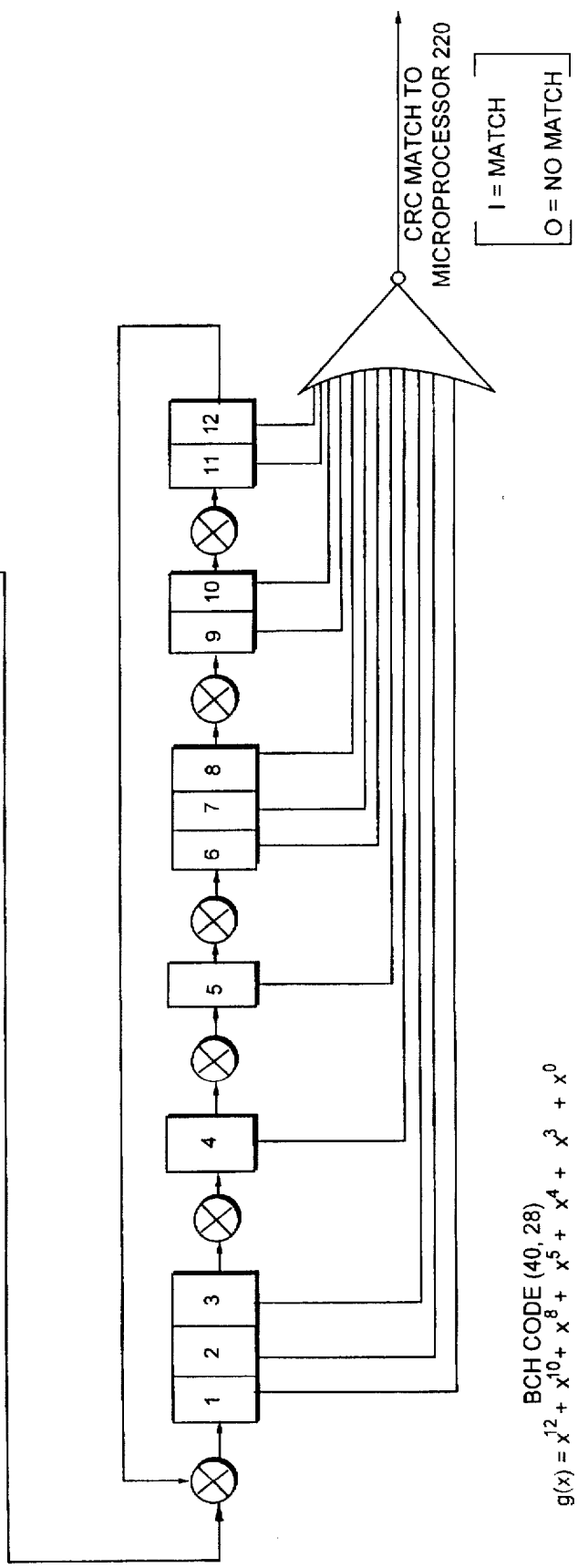
FIG. 9 is a more detailed block diagram showing a specific BCH decoder for an example BCH code (40, 28) for decoding samples of received 40-bits by the radio modem.

A more detailed function block hardware diagram for the BCH decoder of FIG. 8 is shown in FIG. 9. Each set of 40 samples from the modem 226 is input to a 40-bit shift register. The samples from the 40-bit shift register are shifted into a subsequent 12-bit (n−k=12) shift register with feedback connections based on the generator polynomial recited in equation (1) above. The output from the feedback shift register are exclusive-ORed to generate the CRC match/no match signal forwarded to the microprocessor 220. As already mentioned, a variety of hardware and software techniques could be used to implement the BCH calculations for each set of sample data, with the only restriction possibly being one of calculation speed.

Figure 10:
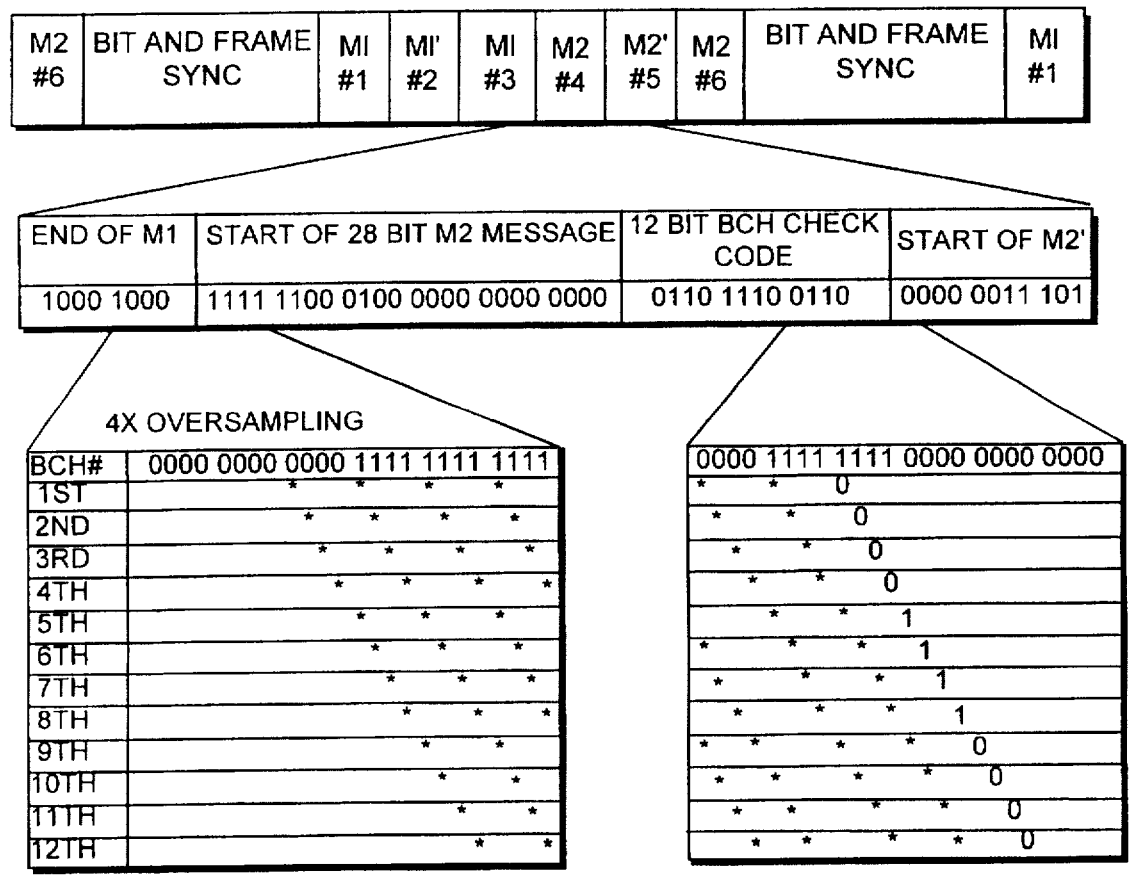
FIG. 10 provides an example illustration of how bits received from an alternate communications channel are sampled, matched with an expected error detection code corresponding to that message, and shifted.

Reference is made to the 40-bit "snapshot" window (i.e., the length of one time slot message) shown in FIG. 10. The mobile radio has tuned to an alternate control channel and is receiving information beginning at the end of message M1 in the third time slot and continuing into message M2' in the fifth time slot of that alternate control channel frame. Using the sampling technique of the present invention, there is no need, for reasons already described above, for the radio to obtain digital bit or frame synchronization with the alternate control channel. Thus, the fact that the radio has tuned to the alternate control channel between the bit and frame synch field for the current frame and the next frame is irrelevant. In other words, the alternate control channel fidelity analysis does not need to wait until the next frame when the bit and frame synch pattern will be detected because that wait means the next frame of information would be lost on the selected control channel. Each of the bits in the 40-bit "snapshot" is sampled four times, and a BCH decode/matching calculation is performed on each set of 40 samples. Twelve BCH calculations are shown in FIG. 10. After each BCH calculation, the 40-sample window upon which the BCH calculation is based is shifted by one sample position. When the sliding window aligns with the complete message M2 in time slot 4, a BCH match is detected (absent any random and false BCH matches). The fifth through the eighth BCH calculations corresponding to the four samples occurring over the width of one bit pulse show BCH matches and therefore register "1's" with the radio microprocessor. Non-matches are registered as "0's".

Since each bit pulse is sampled four times in this example, theoretically the maximum number of BCH matches would be four sets of 40 samples, i.e., four "1's". Because of the cyclic nature of CRC codes, however, it is possible for the BCH matches to occur several bits early. Moreover, because the "EYE" pattern of actual received bit pulses does not conform to a perfect square wave, the actual number of samples viewed as reliable is preferably limited to some large percentage of the total number of samples per bit, e.g., 75%. Applying this reliability "filter" to our simple sample, only two or three of the four samples would be used. Of course, a greater degree of resolution is achieved with a larger number of samples per bit. For example, with eight samples per bit, six of the samples of the eight (i.e., 75%) may reused reliably in calculating the fidelity indicator.

Figure 11A:
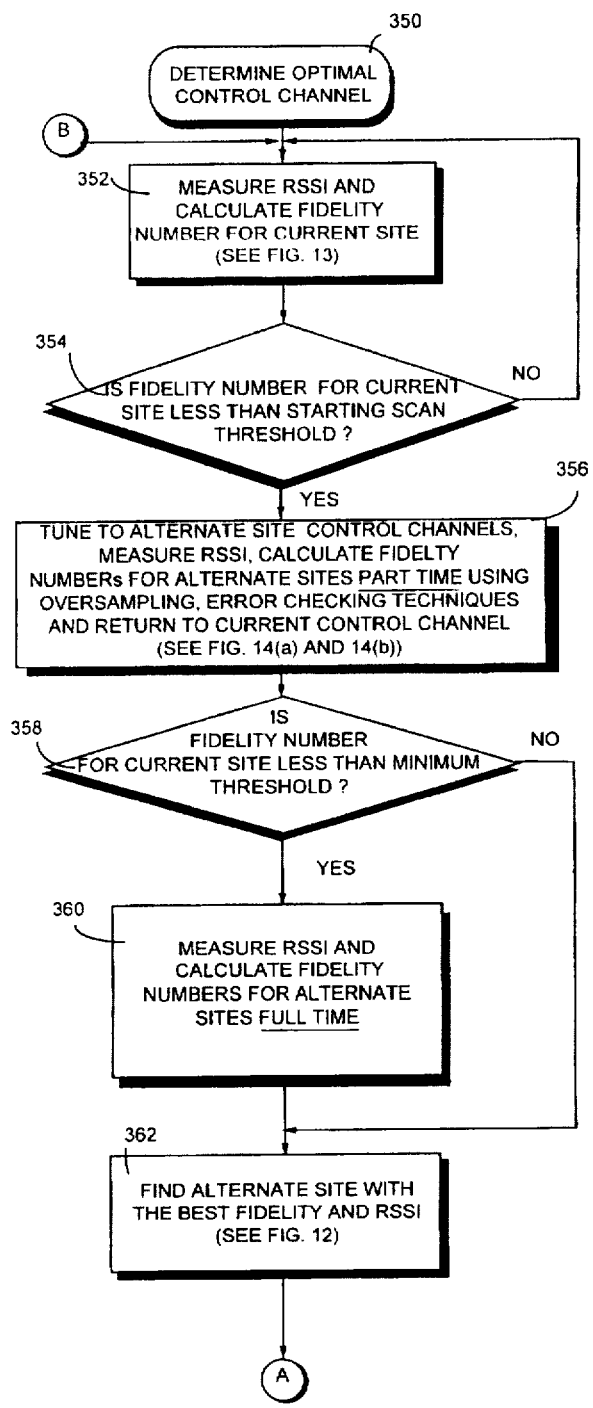
FIGS. 11A–11B are flow chart diagrams illustrating an example set of procedures for determining an optimal control channel having a frame format in accordance with FIGS. 6 and 7.
Figure 11B:
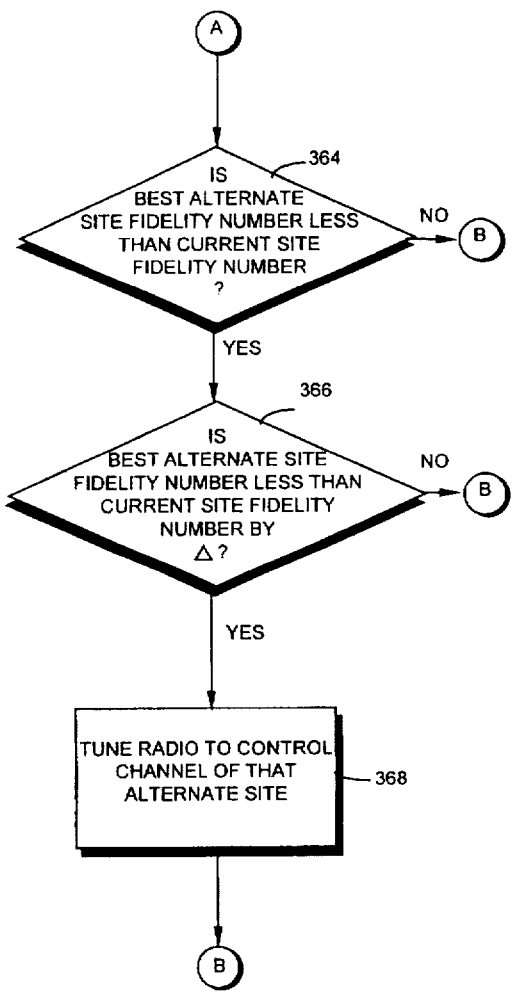

Reference is now made to the flow chart illustrated in FIGS. 11A and 11B for determining an optimal control channel (block 350) in accordance with the above example. The received signal strength indicator (RSSI) is measured and the fidelity number for the currently selected site control channel is calculated in accordance with the procedures outlined in FIG. 13 (block 352). In block 354, a decision is made whether the fidelity number calculated for communications received over the control channel of the current site is less than a starting scan threshold. If it is not, the radio continues to calculate and update the signal fidelity indicator/number for the current site control channel (block 352). Although not shown in FIG. 11, the radio may also at this point pursue signal fidelity calculations and comparisons of a "priority site" if a non-priority site control channel is currently selected by the radio.

Figure 14A:
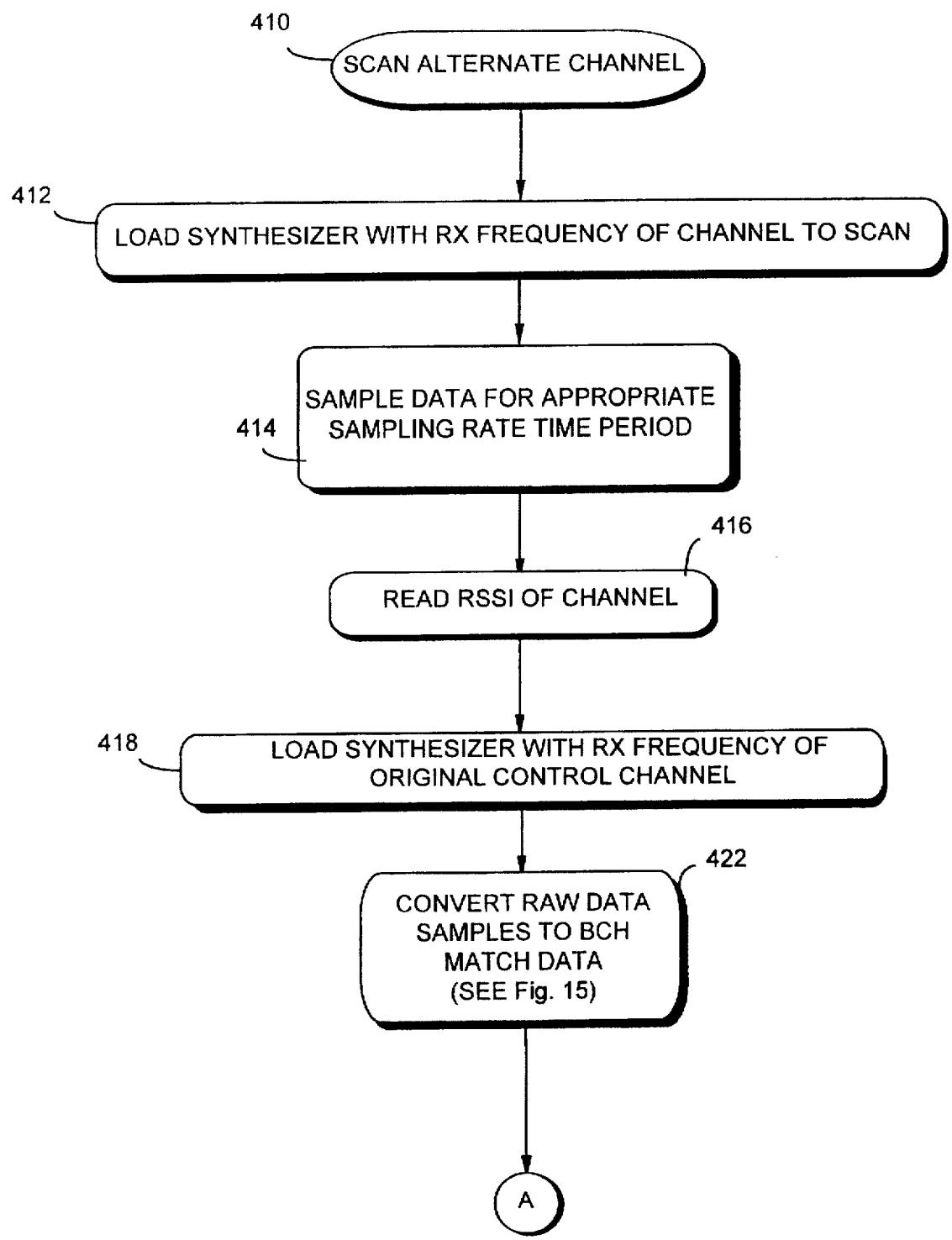
FIGS. 14A–14B are flow chart diagrams outlining example procedures for scanning alternate control channels.
Figure 14B:
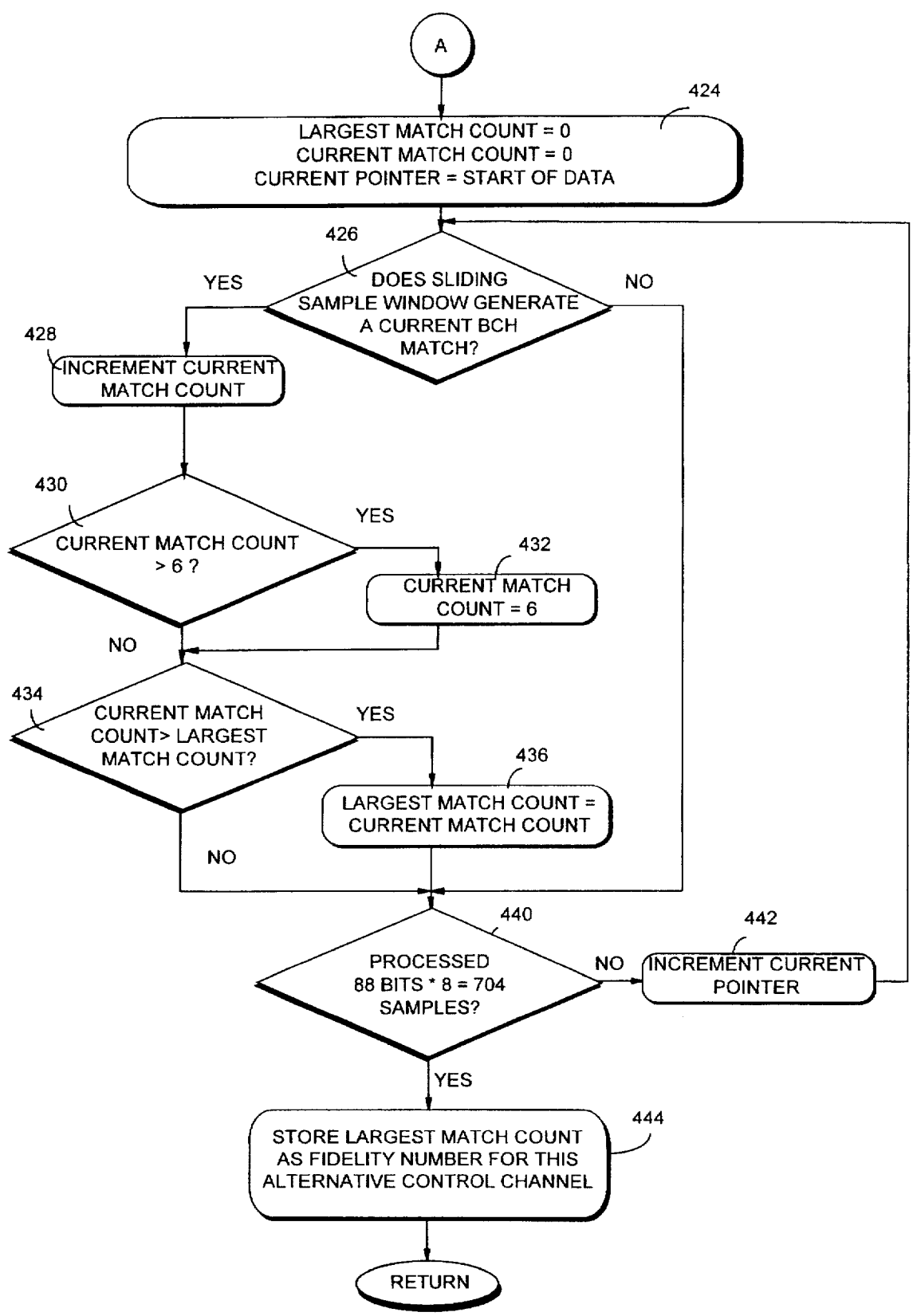

If the fidelity number calculated for the current site is less than the starting scan threshold, control proceeds to block 356 where the radio receiver is tuned to an alternate site control channel, the RSSI of that alternate control channel is measured by RSSI detector 233, and the fidelity indicators for various alternate sites are calculated using the oversampling error checking technique described above and as also described in conjunction with FIGS. 14A–14B (block 356). The radio thereafter returns to the currently selected control channel without missing any information transmitted over that control channel on the next frame. A determination is made in block 358 whether the fidelity number calculated for the current site is less than the minimum threshold. If not, control proceeds to block 362. But if the current site fidelity number is less than the minimum threshold, control proceeds to block 360 where RSSI and fidelity numbers for communications received on alternate site control channels are calculated on a full-time basis using the oversampling error checking technique described above. The alternate site control channel with the best fidelity number, and if necessary, received signal strength indicator is determined block 362.

A decision is made in block 364 whether the best alternate site control channel fidelity number is less than the current site control channel fidelity number. If it is not, control proceeds via flag B back to block 352 to continue the calculation of fidelity numbers for the current and alternate site control channels. Otherwise, a determination is made in decision block 336 whether the best alternate site control channel fidelity number is less than the current site control channel fidelity number by a preset Δ amount. This Δ is an optional feature but is advantageous in the sense that it provides a deadband to prohibit switching back and forth between current and alternate control channels until the channel switch is more than marginally advantageous in terms of improved signal fidelity. For this reason, if the difference in fidelity numbers for the alternate and current control channels do not exceed the Δ amount, control returns to block 352 where fidelity number calculations for current and alternate control channels continue. Otherwise, control proceeds to block 368 where the radio microprocessor 220 commands the radio receiver 230 to tune to the higher fidelity signal communications provided on the control channel of the alternate site which then becomes the new, currently selected control channel. Thereafter, the above-described procedure repeats starting from decision block 352.

Figure 12:
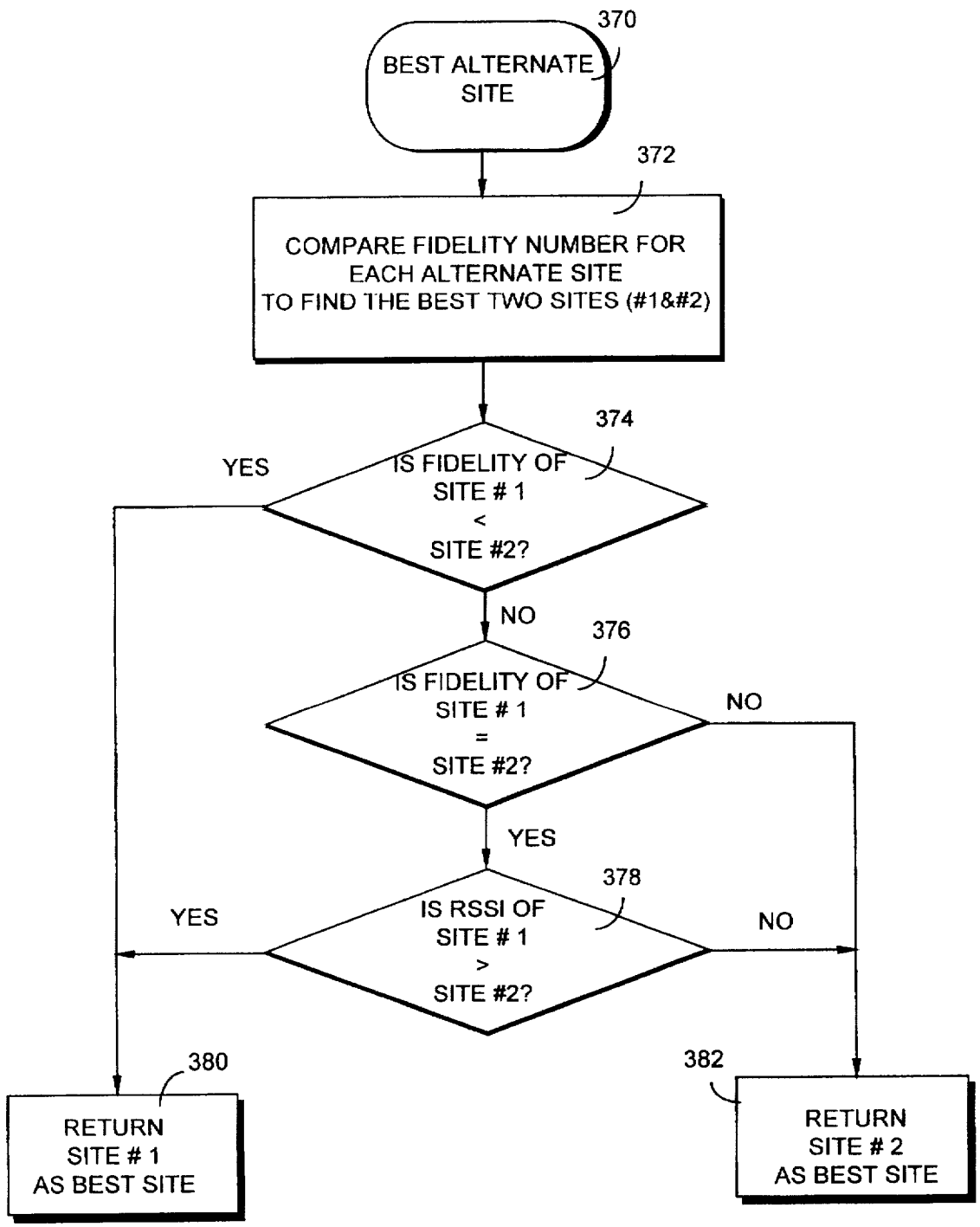
FIG. 12 is a flow chart for determining which of two channels having substantially the same signal fidelity to select as the current control channel.

The routine for determining the best adjacent site (block 370) will now be described in conjunction with FIG. 12. The fidelity number calculated for each alternate site control channel is compared to find the best two sites having the largest fidelity numbers (block 372). A decision is made in block 374 whether the fidelity indicator calculated for site number 1 control channel is greater than that calculated for the site number 2 control channel. If it is, site number 1 is returned as the best site (block 380). Otherwise, decision is made in block 376 whether the fidelity numbers calculated for both site control channels are the same. If they are not, the site 2 control channel has the greater fidelity number and is returned as the best site (block 382). Otherwise, the RSSI detected for each site's control channel is used as the "tie-breaker" in block 378. In other words, the site control channel having the greater RSSI is returned as the best site.

Figure 13:
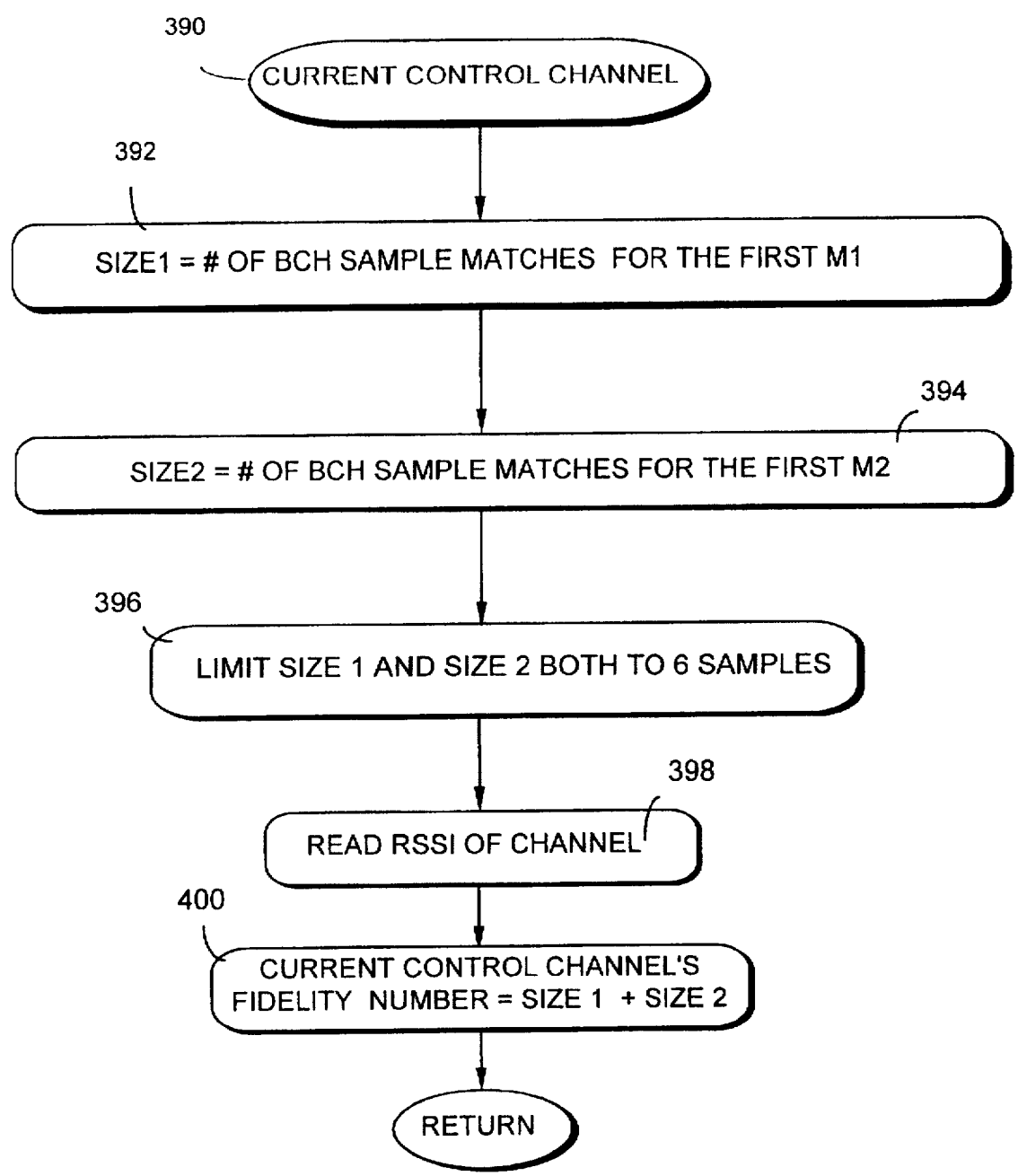
FIG. 13 is a flow chart diagram illustrating example procedures for determining fidelity of a currently selected control channel.

Reference is now made to the routine 390 illustrated in FIG. 13 for calculating the fidelity of the currently selected control channel. For the currently selected control channel, synchronization has already been obtained so the radio knows within one or two bits where the various time slot messages begin and end. Therefore, the sliding window need only slide one or two bits in order to obtain the necessary BCH calculation data. Of course, for each received bit, the BCH match calculation window slides over multiple sample positions, e.g., four or eight samples per received bit. In step 392, the number of BCH sample matches for the first message M1 in the first time slot is calculated as Size 1. After the first M1 message, M1', M1, and M2 are received. The number of BCH sample matches for the first M2 message is calculated in step 394 and identified as Size 2. Assuming a sampling rate of eight samples per data bit, the BCH sample matches for messages M1 and M2 are limited to six of the eight samples (block 396). The RSSI of the current control channel is read (block 398), and the current control channel fidelity number is calculated as the sum of Size 1 and Size 2. To insure accurate comparison, both the control channel and each of the scanned channels are averaged. However, the control channel is divided by 2 to normalize its value compared to each of the scanned channels.

Reference is made to FIGS. 14A-14B which show the routine for scanning an alternate control channel (block 410). A frequency synthesizer in the radio receiver 230 is loaded with the received frequency of the alternate control channel to be scanned (block 412). The received data bits are sampled by the radio modem for a time period appropriate for the sampling rate (block 414). In order to sample each bit eight times and to collect a sufficient amount of data to make the necessary sliding window BCH calculations for a message length of 40-bits, 13.33 milliseconds worth of data is collected corresponding to 128 bits, which sampled 8 times per bit corresponds to 1024 samples. The RSSI of the alternate control channel is then measured in (block 416). The radio microprocessor loads the received frequency of the original control channel into the receiver frequency synthesizer (block 418) so the radio returns to the currently selected control channel. The raw data samples are then converted to BCH match data in accordance with the routine illustrated in FIG. 15 (block 422).

Control proceeds via flag A to block 424 in FIG. 14B where a largest match count variable and current match count variable are set to zero. In addition, a current sample set pointer is set to the first sample value in the collected raw samples where it makes sense to look for valid BCH matches. In this regard, there can only be a valid BCH match when 40 bits (the message length in this example) of sample data have been buffered for the BCH calculation. Assuming 8 samples per bit, 320 samples must be buffered before the match calculations need to be calculated. Alternatively, if BCH calculations are always made regardless of the amount of data, as they might be in a hardware implementation, the BCH match calculations need to be actively considered only after the 319th sample. Assuming the latter hardware scenario, the current pointer would be set to point at sample number 320. A decision is made in block 426 whether the current window of 40 samples generates a BCH match. If not, control proceeds to block 440. If there is a BCH match, the current match count is incremented (block 428), and a decision made if the current match count exceeds six for the example where eight samples are taken per bit (block 430). As described above, for a preferred implementation, only six of the eight bits are used as reliable with bits 1 and 8 discarded. If so, the current match count is limited to six (block 432).

A decision is then made in block 434 whether the current match count exceeds a largest match count. There may be more than one instance in the entire set of raw sample data where one or more BCH matches is detected. The goal of the routine in FIGS. 14A and 14B is to return the largest match count detected for the entire set of raw sample data being analyzed during this scan, e.g., the largest match count detected over the 1024 samples. If the current match exceeds the largest match count, the largest match count is set equal to the current match count value (block 436). Control proceeds from blocks 426 and 436 as well as from a negative decision at block 434 to decision block 440 to determine whether all of the raw bits (88 bits) scanned have been processed. In this example, a total of 88 bits are processed corresponding to 704 samples. This of course does not include the first 40 bits gathered to intially fill the BCH buffer. If not, the sliding window sample pointer is incremented to the next sample (block 442) and control returns to decision block 426. When all the sample sets are processed, the largest BCH match count corresponds to the fidelity number for this alternate control channel.

Figure 15:
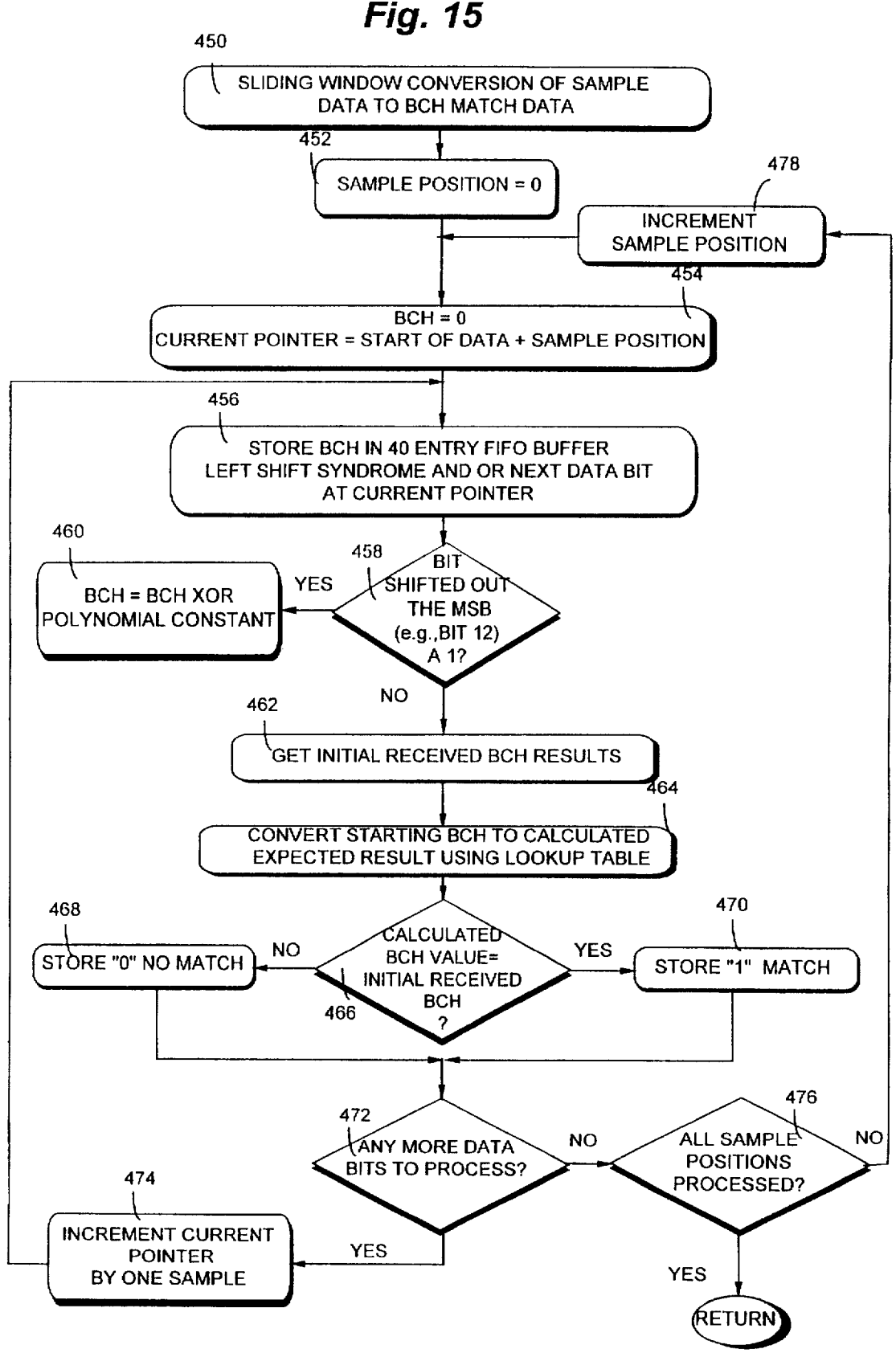
FIG. 15 is a function block diagram illustrating example procedures for sliding window conversions of sample data to BCH match data.

FIG. 15 illustrates an example software procedure to convert the raw sample data to BCH match data. The raw data is stored as a series of 8 samples per data bit. However, the software method calculates BCH data by sampling every 8th sample. Blocks 452, 476, and 478 create a loop for all 8 sets of samples. Each series of samples is calculated independently. Block 454 sets the data sample pointer at the first data bit offset by the particular series of 8 samples being calculated. Block 456 saves the current BCH syndrome in a 40-entry FIFO buffer. This syndrome is used 40 bits later in block 464 to determine a BCH match or no-match result. The remaining part of block 456 along with blocks 458 and 460 illustate conventional BCH polynomial bit division. In order to determine a BCH match or no-match, the starting BCH syndrome from 40 bits in the past is retrieved in block 462. Block 464 converts this starting syndrome to what it should be 40 bits later after being shifted and divided by the polynomial. The current actual syndrome is compared to the expected one from the lookup table in block 469. Block 472 checks for any more of the 128 data bits to process. Block 474 increments the pointer to the next data bit (sampled). Finally, block 476 checks if all sample sets are completed.

While the invention has been described in connection with what is presently considered to be the most practical and preferred embodiment, it is to be understood that the invention is not to be limited to the disclosed embodiment. On the contrary, the invention is intended to cover various modifications and equivalent arrangements included within the spirit and scope of the appended claims. For example, although the present invention has been described in terms of digital control channels, the present invention is not restricted to control channels and may be applied to any type/purpose communication channel.

What is claimed is:

1. A method for operating a transceiver comprising the steps of:
   monitoring a current communications channel;
   during the monitoring step, determining a first fidelity of a signal received on another communications channel; and
   returning after the determining step to the current communications channel before new information intended to be monitored by the radio but which has not previously been received by the radio is transmitted on the current communications channel.

2. The method in claim 1, further comprising:
   determining a second fidelity of a signal received on the current communications channel;
   comparing the first fidelity and second fidelity;
   selecting an optimal communications channel based on the comparing step.

3. The method in claim 1, wherein the other communications channel is a digital radio channel or an analog radio channel.

4. A method for operating a portable radio comprising the steps of:
   (a) monitoring a current radio communications channel which is divided into a series of frames with each frame including a first field of synchronization bits and a second field of message bits, the second field including a first message followed by other information;
   (b) after the first message, scanning another radio communication channel; and
   (c) returning to the current communications channel by or before the start of a next frame in the series of frames.

5. The method in claim 4, further comprising:
   after step (a), determining whether the other information in the frame needs to be processed by the radio, and if the other information does not need to be processed by the radio, proceeding to step (b).

6. The method in claim 4, further comprising the step of:
   (a1) after step (a), determining whether the first message was correctly received by the radio, and if so, proceeding to step (b).

7. The method in claim 6, further comprising:
   (a2) after step (a1) and before step (b), determining whether the other information in the frame should be processed by the radio, and if the other information does not need to be processed by the radio, proceeding to step (b).

8. The method in claim 4, wherein the other information includes redundant, idle, or nonessential information.

9. The method in claim 4, wherein the radio remains synchronized on the current communications channel while scanning the other channel.

10. The method in claim 4, said scanning step (b) further comprising:
    determining a first fidelity of a signal received on the other radio communications channel.

11. The method in claim 10, further comprising the steps of:
    determining a second fidelity of a signal received on the current or yet another communications channel;
    comparing the first fidelity and second fidelity; and
    selecting the communications channel as an optional communications channel based on the comparing step.

12. The method in claim 11, further comprising:
    detecting a received signal strength for the communications channels, where in the event that the first fidelity and second fidelity are substantially the same, selecting the communications channel having the greater received signal strength.

13. A method for operating a portable radio comprising the steps of:
    (a) obtaining synchronization with a first digital radio channel which is divided into a series of frames with each frame including a first field of synchronization bits and a second field of message bits, the second field including a first message followed by other information;
    (b) after the first message, tuning to a second digital radio channel;
    (c) determining a fidelity of a signal received on the second digital radio channel without obtaining synchronization with the second digital radio channel; and
    (d) returning to the first radio channel.

14. The method in claim 13, wherein the radio returns to the first radio channel by or before the start of a next frame in the series of frames.

15. The method in claim 13, wherein the radio remains synchronized with the first digital radio channel during steps (b) and (c).

16. The method according to claim 13, wherein each frame includes a bit field of synchronization bits and a message field including redundant messages.

17. The method according to claim 16, wherein the message field includes three first redundant messages, with one of the first redundant messages being received in complement form, and three second redundant messages, with one of the second redundant messages being received in complement form.

18. The method in claim 17, further comprising:
    determining whether the redundant messages, after the first message, can be ignored for the current frame, and if so, performing steps (b) and (c).

19. The method in claim 17, further comprising:
    determining whether the first message was correctly received, and if so, performing steps (b) and (c) if the redundant messages after the first message can be ignored for the current frame.

20. The method in claim 13, further comprising:
    determining a fidelity for a signal received on the first radio channel, and
    selecting as the current communications channel the channel having the highest fidelity.

21. The method in claim 16, wherein step (c) is performed using only information from the message field.

22. The method in claim 16, wherein step (c) is performed using the bit field of synchronization bits and the message field.

23. The method in claim 16, wherein step (c) is performed using only the bit field of synchronization bits.

19

24. The method in claim 13, wherein received sample data corresponding to a length of the first message are stored in a register and sampled data bits are serially shifted through the register with steps (b)–(d) being performed on shifted groups of sampled data bits corresponding to the message length, each group changing by the addition of a new sample bit at one end of the register and removal of an oldest sample bit at the other end of the register.

25. The method in claim 24, further comprising:
determining plural matches as sample data bits are shifted through the register along with corresponding fidelity values for each match, and
selecting as the optimal match for the communications channel the match with the highest fidelity indicator.

26. The method in claim 13, further comprising:
performing steps (a)–(d) plural times to acquire an average fidelity indicator for the communications channel.

27. A method for determining the fidelity of a digital signal received over a digital communications channel, comprising the steps of:
(a) receiving a digital signal on the digital communications channel including a number of digital bits corresponding to a message;
(b) sampling each received bit in the message N times at N corresponding sampling intervals, where N is a positive integer;
(c) comparing sets of sample values obtained at corresponding ones of the sampling intervals to an expected set of values for the received bits; and
(d) summing the total number of times when the compared sets of sampled values match to generate a fidelity indicator for the digital communications channel, wherein a larger total number indicates higher signal fidelity.

28. The method in claim 27, wherein N is eight and step (c) compares samples for only the second through the seventh sampling intervals.

29. The method in claim 27, wherein N is four and step (c) compares samples for only the second and third sampling intervals.

30. The method in claim 27, wherein only a portion of the samples for each bit are used in the step (c).

31. The method in claim 27, wherein the fidelity indicator indicates both how accurately the digital information was received and how free the received digital signals were from distortion.

32. The method in claim 27, wherein the sampling step may occur irrespective of bit or frame synchronization with the received digital signal.

33. The method in claim 27, wherein the expected set of values includes a known recurring bit pattern.

34. The method in claim 27, wherein the message includes a data portion of bits and a cyclic redundancy code (CRC) portion of bits, and the method further includes: after the sampling step (b), calculating a CRC for the set of sampled values with the expected value being a received CRC such that the calculated and received CRC are compared in the comparing step and a match occurs when the calculated and received CRCs are the same.

35. The method in claim 34, wherein the data portion includes 28 bits and the CRC portion includes 12 bits, and wherein the CRC is a (40, 28) Bose-Chauduri-Hocquenghem (BCH) code.

36. The method in claim 27, further comprising:
temporarily monitoring a different digital communications channel;

20 sampling a number of bits received on the different digital communications channel corresponding to a length of the message N times at N corresponding intervals;
comparing set of sample values obtained at corresponding ones of the sampling intervals to an expected set of values for the received bits on the different digital communications channel; and
summing the total number of times when the compared sets of sampled values match to generate a fidelity indicator for the digital communications channel.

37. The method in claim 36, further comprising:
comparing fidelity indicators for both channels, and
selecting the channel having the higher fidelity indicator.

38. The method in claims 37, further comprising:
determining whether a difference between the fidelity values exceeds a predetermined delta, and
selecting the different digital communications channel only when the difference is equal to or exceeds the delta.

39. The method in claim 37, further comprising:
determining multiple fidelity indicators for each channel, and
averaging the multiple fidelity indicators.

40. A radio communications system comprising:
a plurality of RF repeater sites, each site having a control channel repeater and a plurality of working channel repeaters; and
a plurality of portable radios each of which monitors a selected control channel of one of the plural sites, the control channel being divided into time slotted frames, each radio including:
a receiver for receiving plural messages per frame over the selected control channel with each message corresponding to one time slot, and
processing circuitry for performing the following tasks:
detecting a first message in one time slot of a frame over the selected control channel,
determining the fidelity of one or more alternative control channels during remaining time slots in the frame, and
returning thereafter to the current communications channel by or before the time the next frame is to be received by the receiver.

41. The system in claim 40, wherein the processing circuitry determines the fidelity of the selected control channel, compares the fidelity of the selected control channel with the fidelity of the one or more alternative control channels, and chooses the control channel with the greatest fidelity.

42. The system in claim 40, wherein the fidelity of the one or more control channels is determined without obtaining synchronization with the one or more control channels.

43. A system for determining the fidelity of a digital signal received over a digital communications channel, comprising:
a radio receiver for receiving a digital signal including a number of digital bits corresponding to a message; and
electronic circuitry for performing the following tasks:
(a) sampling each received bit in the message N times at N corresponding sampling intervals, where N is a positive integer;
(b) comparing sets of sample values obtained at corresponding ones of the sampling intervals to an expected set of values for the received bits; and
(c) summing the total number of times when the compared sets of sampled values match to generate a fidelity indicator, wherein a larger total number indicates higher signal fidelity.

44. The system in claim 43, wherein N is eight and step (c) compares samples for only the second through the seventh sampling intervals.

45. The system in claim 33, wherein only a portion of the samples for each bit are used in the step (c).

46. The system in claim 43, wherein the fidelity indicator indicates both how accurately the digital information was received and how free the received digital signals were from distortion.

47. The system in claim 43, wherein sampling occurs irrespective of bit or frame synchronization with the received digital signal.

48. The system in claim 43, wherein the message includes a data portion of bits and a cyclic redundancy code (CRC) portion of bits and the electronic circuitry calculates a CRC for the set of sampled values with the expected value being a received CRC such that the calculated and received CRC are compared in the comparing step and a match occurrs when the calculated and received CRCs are the same.

49. The system in claim 43, wherein the electronic circuitry includes a register corresponding to a length of the message and received sampled data bits are serially shifted through the register, and wherein tasks (a)–(c) are performed on shifted groups of sampled data bits corresponding to the message length, each group changing by the addition of a new sample bit at one end of the register and removal of an oldest sample bit at the other end of the register.

50. The system in claim 49, wherein plural matches are determined as sample data bits are shifted through the register along with corresponding fidelity values for each match, and wherein the optimal match for the communications channel is selected as the match with the highest fidelity indicator.

51. The method in claim 48, wherein the electronic circuitry further temporarily monitors a different digital communications channel;

samples a number of bits received on the different digital communications channel corresponding to a length of the message N times at N corresponding intervals;

compares set of sample values obtained at corresponding ones of the sampling intervals to an expected set of values for the received bits on the different digital communications channel; and sums the total number of times when the compared sets of sampled values match to generate a fidelity indicator for the digital communications channel.

* * * * *

UNITED STATES PATENT AND TRADEMARK OFFICE
CERTIFICATE OF CORRECTION

PATENT NO. : 5,761,240
DATED : June 2, 1998
INVENTOR(S) : Russell L. Croucher, Jr.

It is certified that error appears in the above-identified patent and that said Letters Patent is hereby corrected as shown below:

On the title page, item [54], the title should read

--METHOD AND APPARATUS FOR DETERMINING AN OPTIMAL COMMUNICATIONS CHANNEL WITHOUT LOSS OF CHANNEL MESSAGES ON A CURRENT COMMUNICATIONS CHANNEL --

Signed and Sealed this

Thirteenth Day of October 1998

Attest:

BRUCE LEHMAN

*Attesting Officer*  *Commissioner of Patents and Trademarks*